US009373148B2

(12) United States Patent
Haugen et al.

(10) Patent No.: US 9,373,148 B2
(45) Date of Patent: Jun. 21, 2016

(54) CONNECT SOCIAL NETWORKING USERS WHO SIMULTANEOUSLY CHECK-IN AT A GEOLOCATION

(71) Applicant: Google Inc., Mountain View, CA (US)

(72) Inventors: Frances Bordwell Haugen, Mountain View, CA (US); Madelaine Boyd, Rye, NY (US)

(73) Assignee: Google Inc., Mountain View, CA (US)

( * ) Notice: Subject to any disclaimer, the term of this patent is extended or adjusted under 35 U.S.C. 154(b) by 205 days.

(21) Appl. No.: 13/958,328

(22) Filed: Aug. 2, 2013

(65) Prior Publication Data

US 2015/0172328 A1      Jun. 18, 2015

Related U.S. Application Data

(60) Provisional application No. 61/679,585, filed on Aug. 3, 2012.

(51) Int. Cl.
*H04W 4/02* (2009.01)
*H04L 29/08* (2006.01)
*G06Q 50/00* (2012.01)

(52) U.S. Cl.
CPC .............. *G06Q 50/01* (2013.01); *H04L 67/12* (2013.01); *H04L 67/18* (2013.01); *H04L 67/22* (2013.01); *H04W 4/021* (2013.01); *H04W 4/023* (2013.01); *H04W 4/028* (2013.01)

(58) Field of Classification Search
CPC ..... H04W 4/021; H04W 4/023; H04W 4/028; G06Q 50/01; H04L 67/22; H04L 67/12; H04L 67/18
See application file for complete search history.

(56) References Cited

U.S. PATENT DOCUMENTS

| | | | |
|---|---|---|---|
| 2009/0198666 A1* | 8/2009 | Winston et al. | 707/5 |
| 2010/0115459 A1* | 5/2010 | Kinnunen et al. | 715/785 |
| 2010/0325194 A1* | 12/2010 | Williamson et al. | 709/203 |
| 2011/0238755 A1* | 9/2011 | Khan et al. | 709/204 |
| 2012/0191512 A1* | 7/2012 | Wuoti et al. | 705/14.1 |
| 2013/0166465 A1* | 6/2013 | Barros et al. | 705/319 |
| 2013/0316735 A1* | 11/2013 | Li et al. | 455/456.3 |

* cited by examiner

*Primary Examiner* — Aaron Lowenberger
(74) *Attorney, Agent, or Firm* — Dority & Manning, P.A.

(57) ABSTRACT

Configurations are provided for suggesting one or more other users within a same or proximate geolocation to enable the user to engage in activities with these suggested users. When the user performs a check-in for a new or different geolocation in an online social networking service, the subject technology can suggest other users who have recently checked-in and/or changed their location to the same place or region. The subject technology can sort one or more suggested users based on geographic proximity, how recently the user checked-in, a distance from the user, and other criteria (e.g., interests, demographic information (e.g., gender, age, etc.), social networking profile, etc.). The suggested users are selected, in one example, to identify one or more users that are typically not in the same place or geolocation but have newly arrived here. The subject technology can prioritize the selection of suggested users based on different criteria.

19 Claims, 7 Drawing Sheets

CONNECT SOCIAL NETWORKING USERS WHO SIMULTANEOUSLY CHECK-IN AT A GEOLOCATION

CROSS-REFERENCE TO RELATED APPLICATIONS

The present application claims the benefit of priority under 35 U.S.C. §119 from U.S. Provisional Patent Application Ser. No. 61/679,585 entitled "CONNECT SOCIAL NETWORKING USERS WHO SIMULTANEOUSLY CHECK-IN AT A GEOLOCATION," filed on Aug. 3, 2012, the disclosure of which is hereby incorporated by reference in its entirety for all purposes.

BACKGROUND

Services based on a determined geographic location of a user can be provided.

SUMMARY

The subject technology provides for suggesting one or more users based at least on geolocation information of a user. The subject technology determines a geolocation of a first user. One or more users are then determined within a predetermined proximity of the determined geolocation of the first user. The subject technology then determines a subset of the determined one or more users that had, within a predetermined period of time, a previous geolocation that is different than the determined geolocation of the first user. Further, the determined subset of one or more users are provided for display.

Yet another aspect of the subject technology provides a system for suggesting one or more users based at least on geolocation information of a user. The system includes memory, one or more processors and one or more modules stored in memory and configured for execution by the one or more processors. The system includes a geolocation module configured to determine a geolocation of a first user, determine one or more users within a predetermined proximity of the determined geolocation of the first user, determine a subset of the determined one or more users that had, within a predetermined period of time, a previous geolocation that is different than the determined geolocation of the first user. The system further includes a scoring module configured to determine respective affinity scores for the determined subset of one or more users in which each respective affinity score is based one or more attributes, and sort the determined subset of one or more users according to the determined respective affinity scores. Further, the system includes a graphical user interface (GUI) display module configured to provide for display the sorted subset of one or more users.

The subject technology further provides for determining a geolocation of a first user. The subject technology determines one or more users within a predetermined proximity of the determined geolocation of the first user. Next, the subject technology determines a subset of the determined one or more users that had, within a predetermined period of time, a previous geolocation that is different than the determined geolocation of the first user. Respective affinity scores are then determined for the determined subset of one or more users in which each respective affinity score is based one or more attributes. The subject technology sorts the determined subset of one or more users according to the determined respective affinity scores. Additionally, the sorted subset of one or more users are provided for display.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

Figure 1:
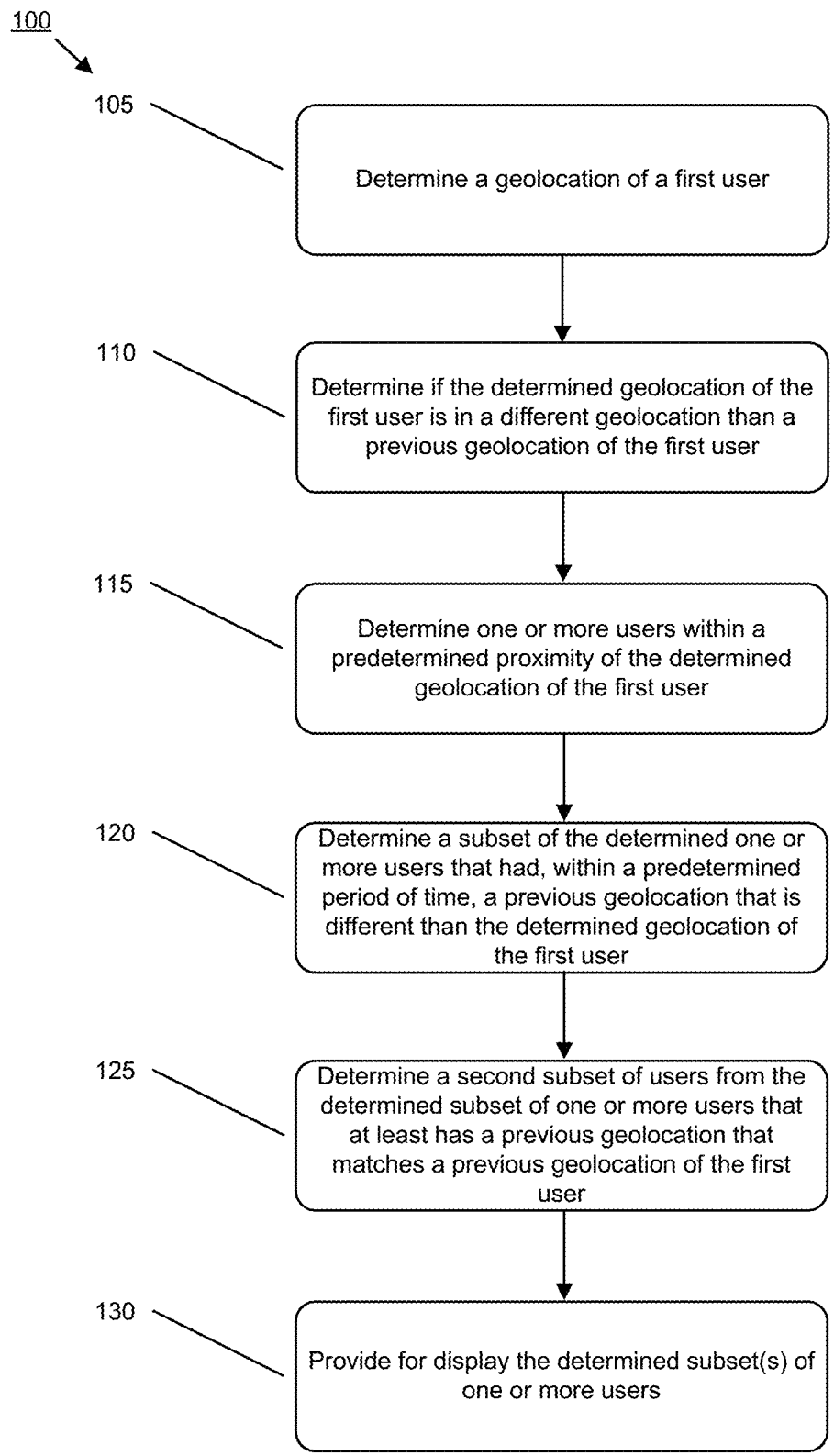
FIG. 1 conceptually illustrates an example process for suggesting one or more users based at least on geolocation information of a user.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

When traveling, domestically or abroad, it can be difficult to meet fellow travelers, especially those traveling in the same place at the same time. Finding other travelers typically makes for a more fun experience, especially for solo travelers, and provides the opportunity to see tourist attractions with others who have not already seen them (as opposed to city locals). In a given social network, a user can opt-in to have his or her geolocation information stored based a current geolocation of the user and/or check-in activity of the user into a new place or geolocation. For instance, the user can carry a mobile device (e.g., cell phone, smartphone, tablet computer, etc.) that provides one or more different signals (e.g., GPS, Wi-Fi, 3G or 4G radio, etc.) for determining the geolocation of the mobile device. The user's geolocation, therefore, can be derived based on the determined geolocation of the mobile device and/or the user's check-in activity.

The subject technology provides for suggesting one or more other users within a same or proximate geolocation to enable the user to engage in one or more activities with these suggested users. When the user performs a check-in for a new or different geolocation in an online social networking service, the subject technology can suggest other users who have recently checked-in and/or changed their location to the same place or region. As used herein, the term "check-in" refers to user activity that allows the user to share his or her current location to other users in the online social network. In the context of an online social networking service (or simply "social network"), the user's check-in activity includes the user's geolocation data.

The subject technology can sort one or more suggested users based on geographic proximity, how recently the user checked-in, a distance from the user, and other criteria (e.g., interests, demographic information (e.g., gender, age, etc.), social networking profile, etc.). The suggested users are selected, in one example, to identify one or more users that are typically not in the same place or geolocation but have newly arrived here. This is different than identifying users that have started checking in to the same or similar geolocation (e.g., new users) to minimize the number of false positives (e.g., to filter out one or more users that are local to the geolocation rather than a traveler or tourist). Additionally, the subject technology can prioritize selection of the suggested users based on a previous geolocation of the suggested users with respect to a previous geolocation of the user. By way of example, the subject technology can determine that the user's previous geolocation was in a particular city (e.g., New York) and identify one or more suggested users with a previous geolocation in the same city. The subject technology can prioritize the selection of suggested users based on other criteria and still be within the scope of the subject technology.

In one example, the subject technology can provide a widget that is integrated into a given social networking service for displaying the suggested users. The widget could be further integrated within an electronic map to show the suggested users in a map view in order to show the distance of the suggested users from the user. Further, the subject technology can be provided on various clients (e.g., desktop or laptop computers, mobile devices, tablet computers, etc.).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server. Moreover, as described herein, demographic-related data may be aggregated for one or more groups of users so that an individual user(s) is not personally identifiable.

FIG. 1 conceptually illustrates an example process 100 for suggesting one or more users based at least on geolocation information of a user. The process 100 is performed by one or more computing devices or systems in some configurations. For instance, a mobile application executing on a mobile device can perform the operations in the process 100 described in further detail below.

The process 100 begins at 105 by determining a geolocation of a first user. In some configurations, determining the geolocation the first user is responsive to check-in activity of the first user. As used herein, the term "check-in" refers to user activity that allows the user to share his or her current location to other users in the online social network. In the context of an online social networking service (or simply "social network"), the user's check-in activity includes the user's geolocation data. For instance, the check-in activity of the first user includes geolocation information of the first user in an online social network. By way of example, the geolocation information is associated with one of an identified place, a point of interest, a business, an airport, a metropolitan area, a neighborhood, a municipality, and a tourist attraction. Other associations to the geolocation can be provided and still be within the scope of the subject technology.

The process 100 at 110 determines if the determined geolocation of the first user is in a different geolocation than the previous geolocation of the first user. The different geolocation is based at least on one of a country, city, county, postal code, or predetermined distance. In some configurations, the previous geolocation of the first user comprises a last shared geolocation of the first user The process 100 at 115 determines one or more users within a predetermined proximity of the determined geolocation of the first user. The predetermined proximity is based on a distance threshold from the determined geolocation of the user in some configurations. In one example, the process 100 determines the one or more users within the predetermined proximity of the determined geolocation of the first user responsive to a respective check-in activity of the one or more users.

The process 100 at 120 determines a subset of the determined one or more users that had, within a predetermined period of time, a previous geolocation that is different than the determined geolocation of the first user. The determination at 120 reduces an amount of users that are considered "false positives" that refer to users that are local users and not traveling users or tourists. For instance, the predetermined period of time is a duration of time (or time period) that the process 100 utilizes to determine one or more users with a previous geolocation that is different than the geolocation of the first user.

The process 100 at 125 determines a second subset of users from the determined subset of one or more users that at least has a previous geolocation that matches a previous geolocation of the first user. In some configurations, the process 100 performs the operations at 125 to further filter one or more suggested users. By way of example, users that match the previous geolocation of the first user can indicate that these users are from the same originating locale (e.g., home town) as the first user.

The process 100 at 130 provides for display the determined subset of one or more users. In some configurations, providing for display of the subset of the determined one or more users is accomplished by generating an electronic map for display with one or more respective graphical representations of the determined subset of one or more users. An example graphical user interface (GUI) for displaying one or more suggested user is described in further detail in FIG. 3. The process 100 then ends.

Figure 2:
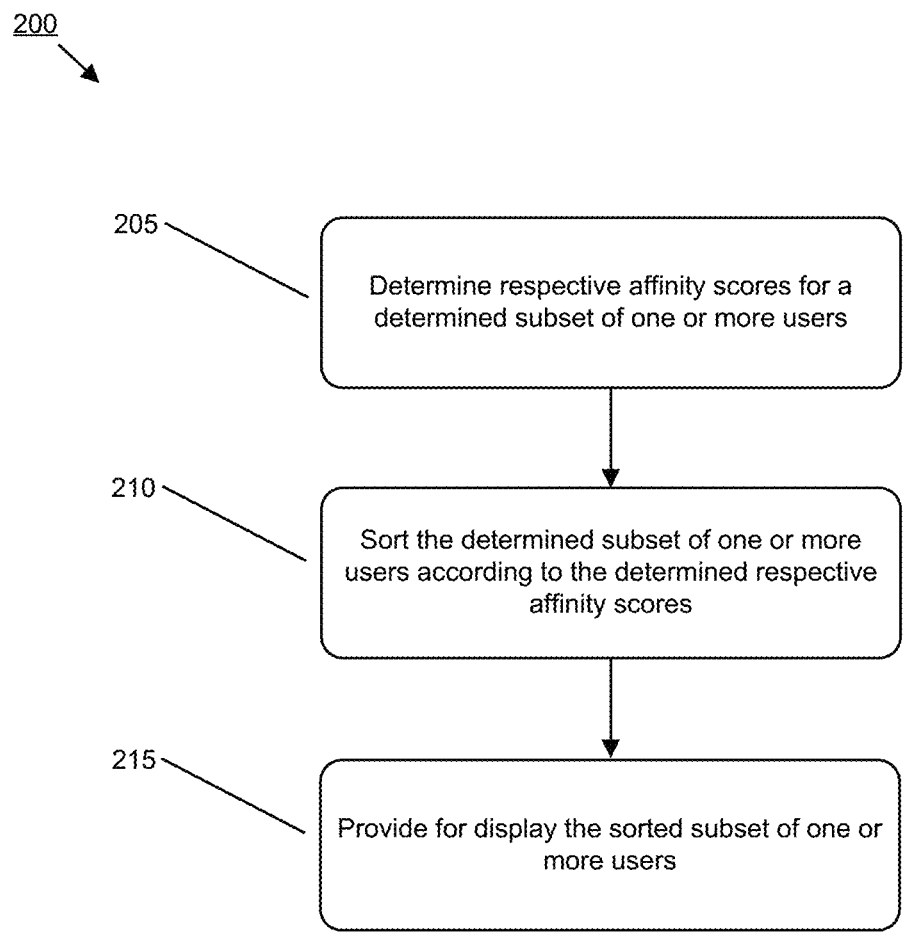
FIG. 2 conceptually illustrates an example process for sorting one or more suggested users according to one or more attributes.

FIG. 2 conceptually illustrates an example process 200 for sorting one or more suggest users according to one or more attributes. The process 200 can be performed by one or more computing devices or systems in some configurations after the one or more suggested users are provided for display by the process 100 described in FIG. 1. Alternatively, the process 200 is performed before the suggested are provided for display by the process 100 in FIG. 1.

The process 200 begins at 205 by determining respective affinity scores for the determined subset of one or more users. Each respective affinity score is based one or more attributes. In one example, the one or more attributes at least includes demographic information of the one or more users. For instance, the demographic information includes at least one of name, gender, ethnicity, age, occupation, education, country of origin, and geographic location. Further, the one or more attributes include at least one of a user interest, hobby, and activity.

The process 200 at 210 sorts the determined subset of one or more users according to the determined respective affinity scores. The process 200 at 215 provides for display the sorted subset of one or more users. An example graphical user interface for displaying the sorted subset of one or more users is described in further detail in FIG. 3. The process 200 then ends.

Figure 3:
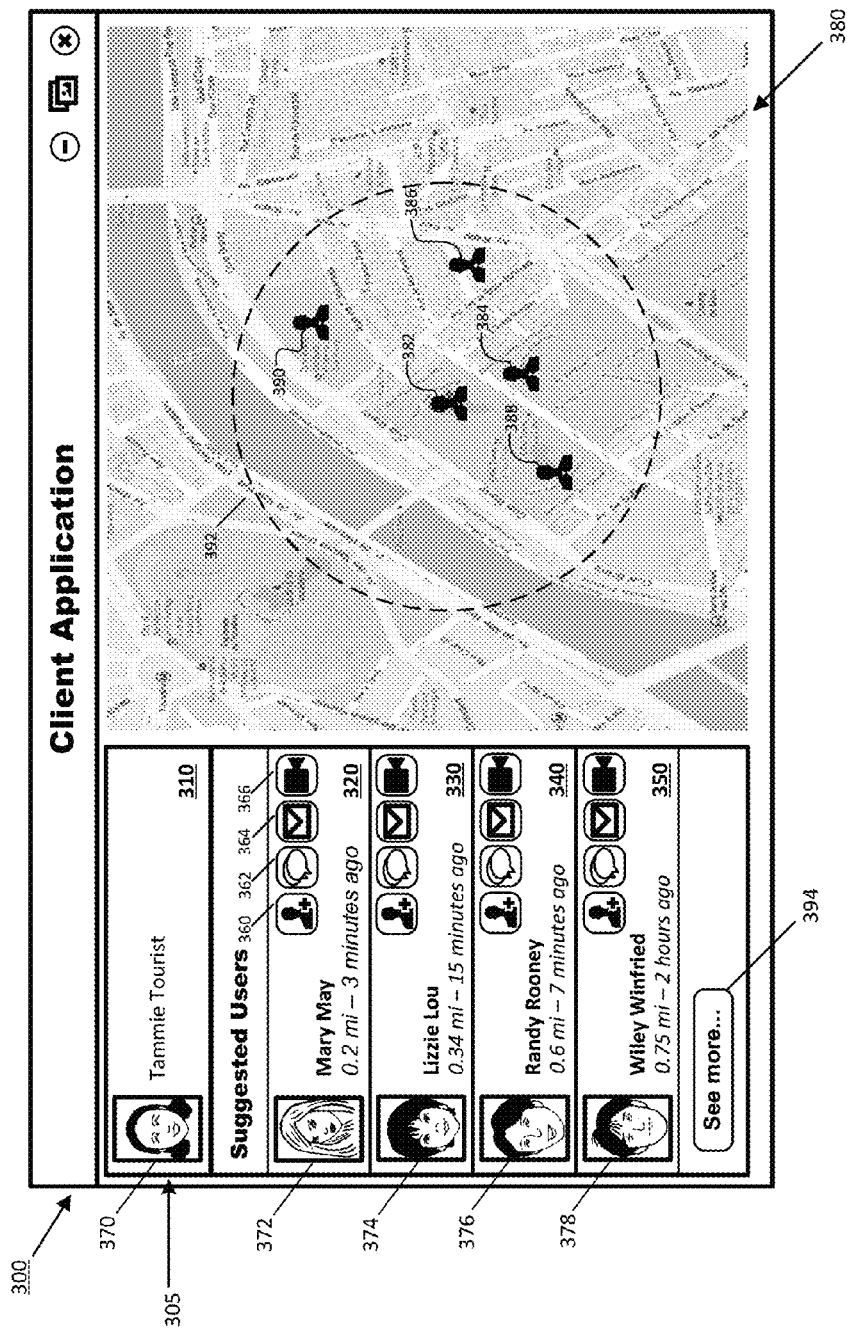
FIG. 3 conceptually illustrates an example graphical user interface (GUI) of some configurations of the subject technology.

FIG. 3 conceptually illustrates a graphical user interface (GUI) 300 in which some configurations of the subject technology can be implemented. More specifically, the GUI 300 can include different sets of graphical elements for displaying one or more suggested users as described by reference to the respective processes described in FIGS. 1 and 2. A graphical element can include, but is not limited to, a button, check box, radio button, slider, list box, drop-down list, menu, combo box, icon, text box, scroll bar, etc. In one example, the GUI 300 is displayed in a client application such as a web browser, mobile application, or desktop application. The GUI 300 is provided by an online social networking service in some configurations.

As illustrated in FIG. 3, the GUI 300 includes a widget including display areas 310, 320, 330, 340 and 350. As used herein, the term "widget" refers to a lightweight application (e.g., lightweight in comparison to a full application suite or software package) providing a GUI that includes one or more graphical elements used to provide a specific application. In the example GUI 300, the display area 310 includes a graphical representation 370 (e.g., an avatar, profile image, icon, etc.) for a user 305 (shown as "Tammie Tourist"). In one example, the user 305 is a member of an online social networking service and opts in to sharing geolocation information.

One or more suggested users are displayed in the GUI 300 in the display areas 320, 330, 340, and 350. The suggested users are provided according to the processes 100 and 200 respectively described in FIGS. 1 and 2. Different graphical representations 372, 374, 376 and 378 corresponding to the suggested users are provided in the display areas 320, 330, 340 and 350. Each of the display areas 320, 330, 340 and 350 include a respective user's name, a distance indicator from a current geolocation of the user 305 and a time indicator showing an period of time that has elapsed since the respective user's geolocation was determined. Additionally, the suggested users can he sorted according to different attributes as described by reference to FIG. 2 above.

Each of the display areas 320, 330, 340 and 350 includes a set of graphical elements (e.g., buttons, icons, etc.) for activating different functionality in some configurations. For instance, as shown in the display area 320, a graphical element 360, upon selection via user input, provides for adding a contact represented by the graphical representation 372. A graphical element 362, upon a selection input, provides for activating an instant messaging or chat session with the contact represented by the graphical representation 372. A graphical element 364, upon selection input, provides for activating functionality for sending an e-mail message to the contact represented by the graphical representation 372. Further, a graphical element 366, upon a selection input, provides for activating a video chat or conferencing session with the contact represented by the graphical representation 372. Other types of functionality can be provided and still be within the scope of the subject technology.

The GUI 300 includes an electronic map 380 that provides for display map location points 382, 384, 386, 388 and 390 that respectively correspond to the users shown in the graphical representations 305, 372, 374, 376 and 378. Additionally, the suggested users are provided according to a predetermined proximity defined by circle 392 (e.g., a distance threshold). In one example, the circle 392 is user selectable to increase or decrease the distance threshold in which one or more suggested users are provided.

Although the example GUI 300 in FIG. 3 includes four suggested users, any number of suggested users can be included in the GUI 300 and still be within the scope of the subject technology. As further shown in the GUI 300, a graphical element 394 (e.g., button, etc.) is provided by the GUI 300 in order to display one or more additional suggested users.

Additionally, although the above description of FIG. 3 includes different example graphical elements in the GUI 300, some implementations can include other graphical elements in the GUI 300 and still be within the scope of the subject technology. Further, the GUI 300 is not required to include all of the aforementioned graphical elements.

Figure 4:
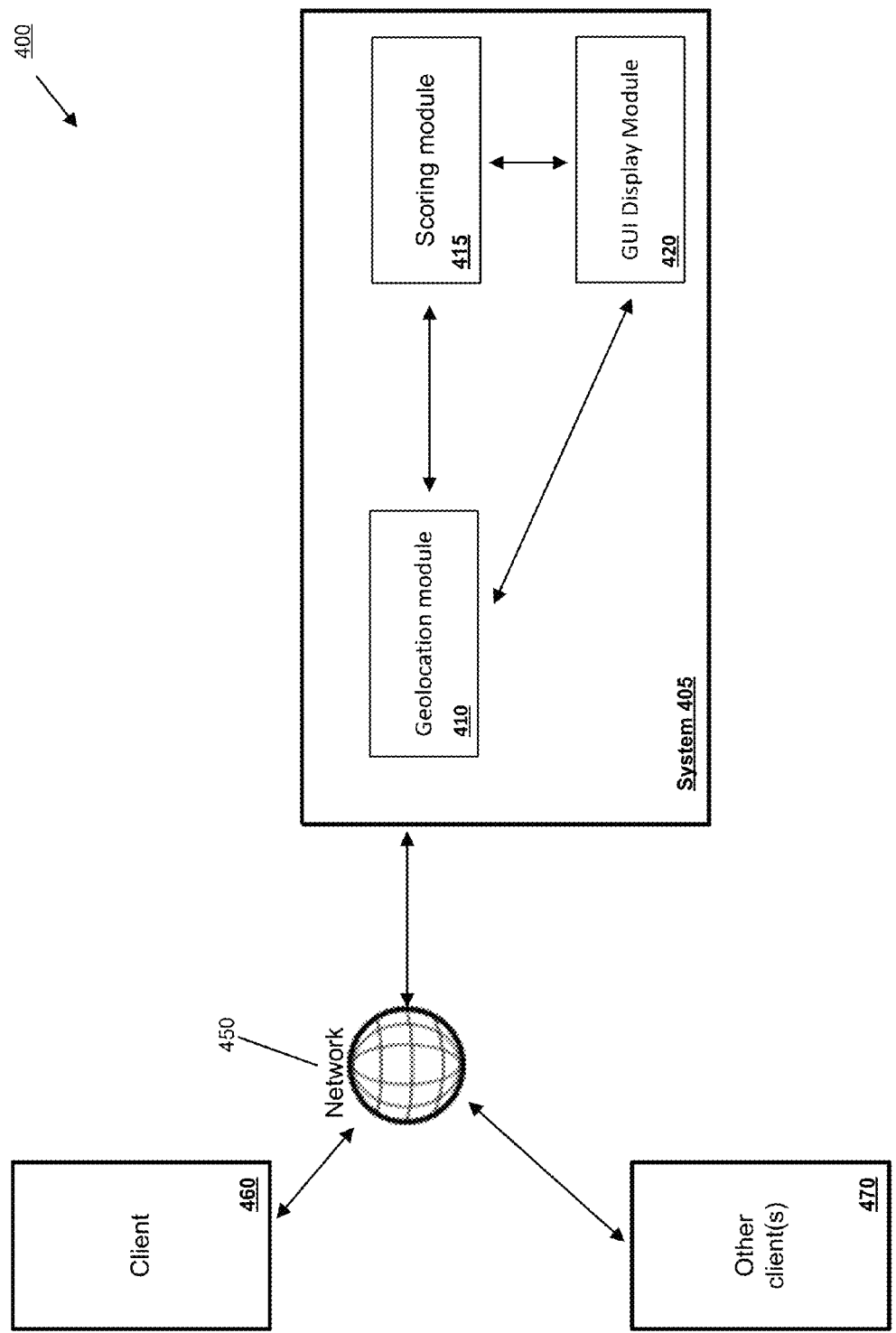
FIG. 4 conceptually illustrates an example computing environment.

FIG. 4 conceptually illustrates an example computing environment 400 including a system. In particular, FIG. 4 shows a system 405 for implementing the above described processes in FIGS. 1 and 2 and for providing the GUI illustrated in FIG. 3. In some configurations, the system 405 is part of an implementation running a particular machine (e.g., a server).

The system 405 can include memory, one or more processors, and one or more modules stored in memory and configured for execution by the one or more processors. As shown in FIG. 4, the system 405 includes several modules for providing different functionality. The system 405 is configured to include a geolocation module 410, a scoring module 415 and a GUI display module 420. The geolocation module 410 is configured to determine a geolocation of a first user, determine one or more users within a predetermined proximity of the determined geolocation of the first user, and determine a subset of the determined one or more users that had, within a predetermined period of time, a previous geolocation that is different than the determined geolocation of the first user. The scoring module 415 is configured to determine respective affinity scores for the determined subset of one or more users in which each respective affinity score is based one or more attributes, and sort the determined subset of one or more users according to the determined respective affinity scores. The one or more attributes at least includes demographic information of the determined subset of one or more users in some configurations. The graphical user interface (GUI) display module 420 is configured to provide for display the sorted subset of one or more users. In some configurations, providing for display of the sorted subset of the one or more users is accomplished by generating an electronic map for display with one or more respective graphical representations of the sorted subset of the one or more users.

As further shown in FIG. 4, each of the aforementioned modules can be configured to communicate between each other. For instance, different data, messages, API calls and returns can be passed between the different modules in the system 405.

The system 405 can communicate over a network 450 with a client 460. The client 460 can each be configured to communicate with the aforementioned modules of the system 405. For instance, the client 460 can transmit a request for providing one or more suggested users based on a user's geolocation over the network 450 to the system 405. The system 405 can then transmit data for displaying one or more suggested users (e.g., as illustrated in FIG. 3) over the network 450 to the client 460. As further shown in FIG. 4, other client(s) 470 can communicate over the network 450 with the system 405 in a similar manner.

Many of the above-described features and applications are implemented as software processes that are specified as a set of instructions recorded on a non-transitory machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, any combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

An API allows a developer of an API calling component (that could be a third party developer) to utilize specified features provided by an API implementing component. There may be one API calling component or there may be more than one such component. An API can be a source code interface that a computing system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some configurations the API implementing component may provide more than one API, each providing a different view of or with different aspects that access different aspects of the functionality implemented by the API implementing component. For example, one API of an API implementing component can provide a first set of functions and can be exposed to third party developers, and another API of the API implementing component can be hidden (not exposed) and provide a subset of the first set of functions and also provide another set of functions, such as testing or debugging functions which are not in the first set of functions. In other configurations the API implementing component may itself call one or more other components via an underlying API and thus be both an API calling component and an API implementing component.

An API defines the language and parameters that API calling components use when accessing and using specified features of the API implementing component. For example, an API calling component accesses the specified features of the API implementing component through one or more API calls or invocations (embodied for example by function or method calls) exposed by the API and passes data and control information using parameters via the API calls or invocations. The API implementing component may return a value through the API in response to an API call from an API calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API calling component) and an API implementing component. Transferring the API calls may include issuing, initiating, invoking, calling, receiving, returning, or responding to the function calls or messages. In other words, transferring can describe actions by either of the API calling component or the API implementing component.

The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API implementing component. The API calling component therefore can declare variables, use pointers to, use or instantiate constant values of such types or classes by using definitions provided in the API.

Generally, an API can be used to access a service or data provided by the API implementing component or to initiate performance of an operation or computation provided by the API implementing component. By way of example, the API implementing component and the API calling component may each be any one of an operating system, a library, a device driver, an API, an application program, or other module (it should be understood that the API implementing component and the API calling component may be the same or different type of module from each other). API implementing components may in some cases be embodied at least in part in firmware, microcode, or other hardware logic. In some configurations, an API may allow a client program to use the services provided by a Software Development Kit (SDK) library. In other configurations an application or other client program may use an API provided by an Application Framework. In these configurations the application or client program may incorporate calls to functions or methods provided by the SDK and provided by the API or use data types or objects defined in the SDK and provided by the API. An Application Framework may in these configurations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API calling component may be a local component (i.e., on the same data processing system as the API implementing component) or a remote component (i.e., on a different data processing system from the API-implementing component) that communicates with the API-implementing component through the API over a network. It should be understood that an API implementing component may also act as an API calling component (i.e., it may make API calls to an API exposed by a different API implementing component) and an API calling component may also act as an API implementing component by implementing an API that is exposed to a different API calling component.

The API can allow multiple API calling components written in different programming languages to communicate with the API implementing component (thus the API may include features for translating calls and returns between the API implementing component and the API calling component). The API however can be implemented in terms of a specific programming language. An API calling component can, in one configuration, call APIs from different providers such as a set of APIs from an OS provider and another set of APIs from a plug-in provider and another set of APIs from another provider (e.g. the provider of a software library) or creator of the another set of APIs.

The following description describes an example API architecture in which some configurations of the subject technology can be implemented.

Figure 5:
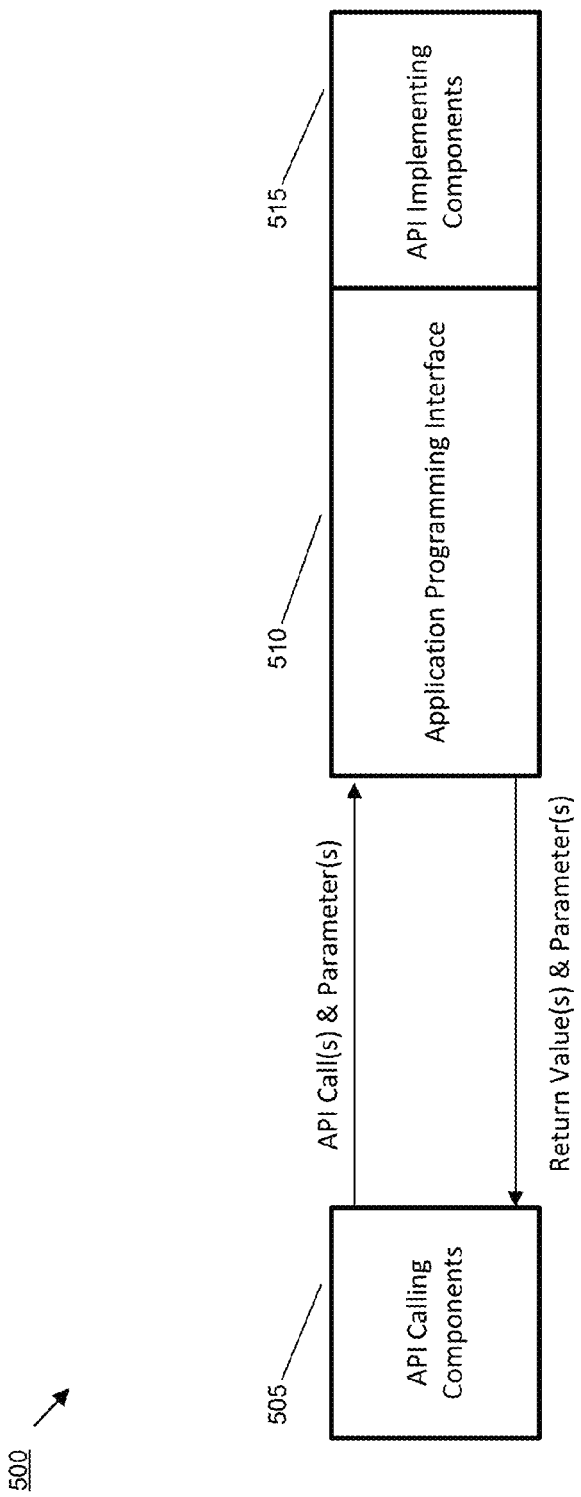
FIG. 5 conceptually illustrates an example application programming interface (API) architecture.

FIG. 5 is a block diagram illustrating an example API architecture, which can be used in some configurations of the subject technology. As shown in FIG. 5, the API architecture 500 includes the API implementing component 515 (e.g., an operating system, a library, a device driver, an API, an application program, software or other module) that implements the API 510. The API 510 specifies one or more functions, methods, classes, objects, protocols, data structures, formats and/or other features of the API-implementing component that can be used by the API-calling component 505. The API 510 can specify at least one calling convention that specifies how a function in the API implementing component receives parameters from the API calling component and how the function returns a result to the API calling component. The API calling component 505 (e.g., an operating system, a library, a device driver, an API, an application program, software or other module), makes API calls through the API 510 to access and use the features of the API implementing component 515 that are specified by the API 510. The API implementing component 515 can return a value through the API 510 to the API calling component 505 in response to an API call.

It will be appreciated that the API implementing component 515 can include additional functions, methods, classes, data structures, and/or other features that are not specified through the API 510 and are not available to the API calling component 505. It should be understood that the API calling component 505 can be on the same system as the API implementing component 515 or can be located remotely and accesses the API implementing component 515 using the API 510 over a network. While FIG. 5 illustrates a single API calling component 505 interacting with the API 510, it should be understood that other API calling components, which can be written in different languages (or the same language) than the API calling component 505, can use the API 510.

The API implementing component 515, the API 510, and the API calling component 505 can be stored in a machine-readable medium, which includes any mechanism for storing information in a form readable by a machine (e.g., a computer or other data processing system). For example, a machine-readable medium includes magnetic disks, optical disks, random access memory, read only memory, flash memory devices, etc.

Figure 6:
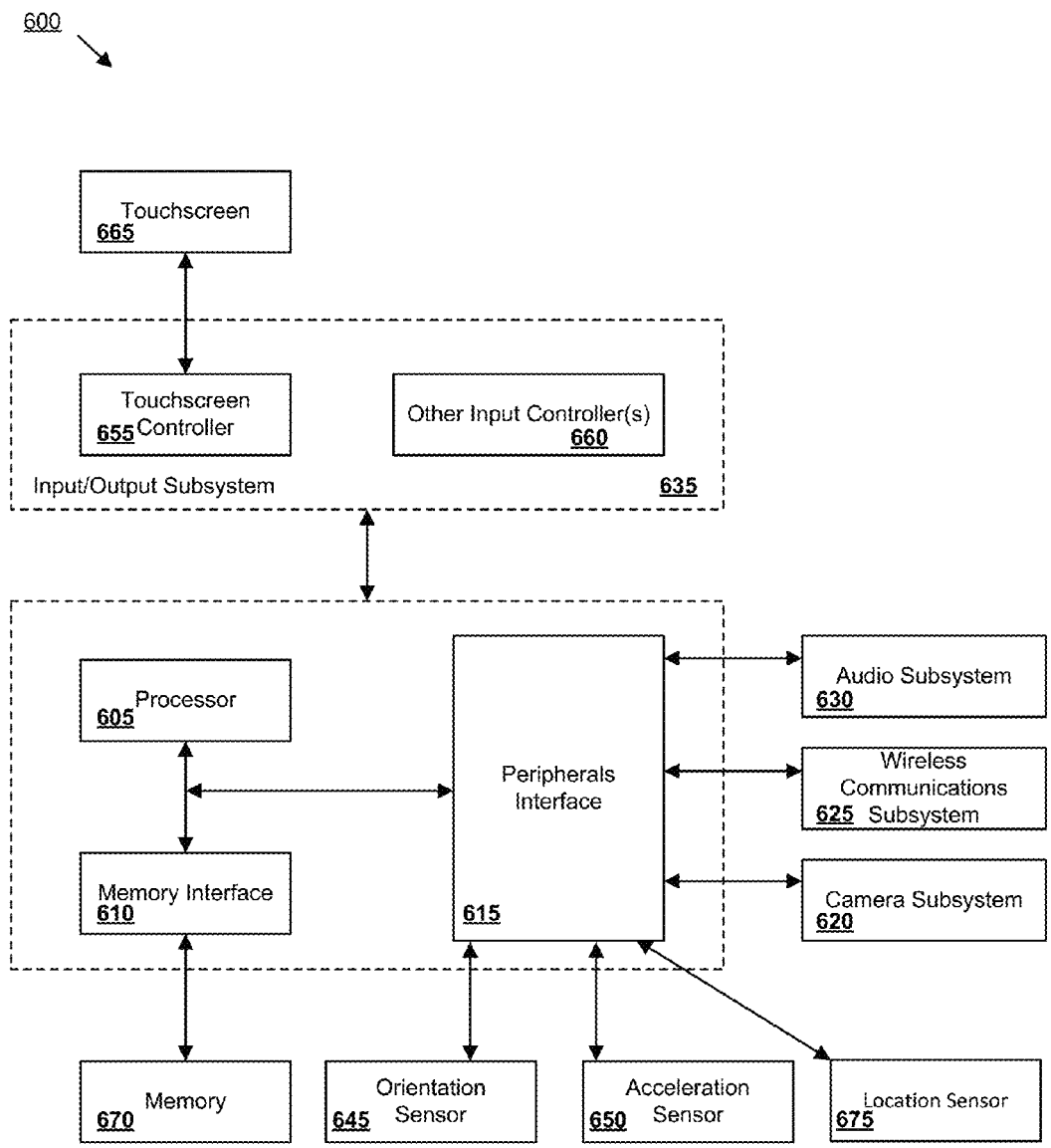
FIG. 6 conceptually illustrates an example architecture of a mobile device.

FIG. 6 is an example of a mobile device architecture 600. The implementation of a mobile device can include one or more processing units 605, memory interface 610 and a peripherals interface 615. Each of these components that make up the computing device architecture can be separate components or integrated in one or more integrated circuits. These various components can also be coupled together by one or more communication buses or signal lines.

The peripherals interface 615 can be coupled to various sensors and subsystems, including a camera subsystem 620, a wireless communication subsystem(s) 625, audio subsystem 630 and Input/Output subsystem 635. The peripherals interface 615 enables communication between processors and peripherals. The peripherals provide different functionality for the mobile device. Peripherals such as an orientation sensor 645 or an acceleration sensor 650 can be coupled to the peripherals interface 615 to facilitate the orientation and acceleration functions. Additionally, the mobile device can include a location sensor 675 to provide different location data. In particular, the location sensor can utilize a Global Positioning System (GPS) to provide different location data such as longitude, latitude and altitude.

The camera subsystem 620 can be coupled to one or more optical sensors such as a charged coupled device (CCD) optical sensor or a complementary metal-oxide-semiconductor (CMOS) optical sensor. The camera subsystem 620 coupled with the sensors can facilitate camera functions, such as image and/or video data capturing. Wireless communication subsystems 625 can serve to facilitate communication functions. Wireless communication subsystems 625 can include radio frequency receivers and transmitters, and optical receivers and transmitters. The aforementioned receivers and transmitters can be implemented to operate over one or more communication networks such as a Long Term Evolution (LTE), Global System for Mobile Communications (GSM) network, a Wi-Fi network, Bluetooth network, etc. The audio subsystem 630 is coupled to a speaker and a microphone to facilitate voice-enabled functions, such as voice recognition, digital recording, etc.

I/O subsystem 635 involves the transfer between input/output peripheral devices, such as a display, a touchscreen, etc, and the data bus of the processor 605 through the Peripherals Interface. I/O subsystem 635 can include a touchscreen controller 655 and other input controllers 660 to facilitate these functions, Touchscreen controller 655 can be coupled to the touchscreen 665 and detect contact and movement on the screen using any of multiple touch sensitivity technologies. Other input controllers 660 can be coupled to other input/control devices, such as one or more buttons.

Memory interface 610 can be coupled to memory 670, which can include high-speed random access memory and/or non-volatile memory such as flash memory. Memory 670 can store an operating system (OS). The OS can include instructions for handling basic system services and for performing hardware dependent tasks.

By way of example, memory can also include communication instructions to facilitate communicating with one or more additional devices, graphical user interface instructions to facilitate graphic user interface processing, image/video processing instructions to facilitate image/video-related processing and functions, phone instructions to facilitate phone-related processes and functions, media exchange and processing instructions to facilitate media communication and processing-related processes and functions, camera instructions to facilitate camera-related processes and functions, and video conferencing instructions to facilitate video conferencing processes and functions. The above identified instructions need not be implemented as separate software programs or modules. Various functions of mobile device can be implemented in hardware and/or in software, including in one or more signal processing and/or application specific integrated circuits.

The following description describes an example system in which aspects of the subject technology can be implemented.

Figure 7:
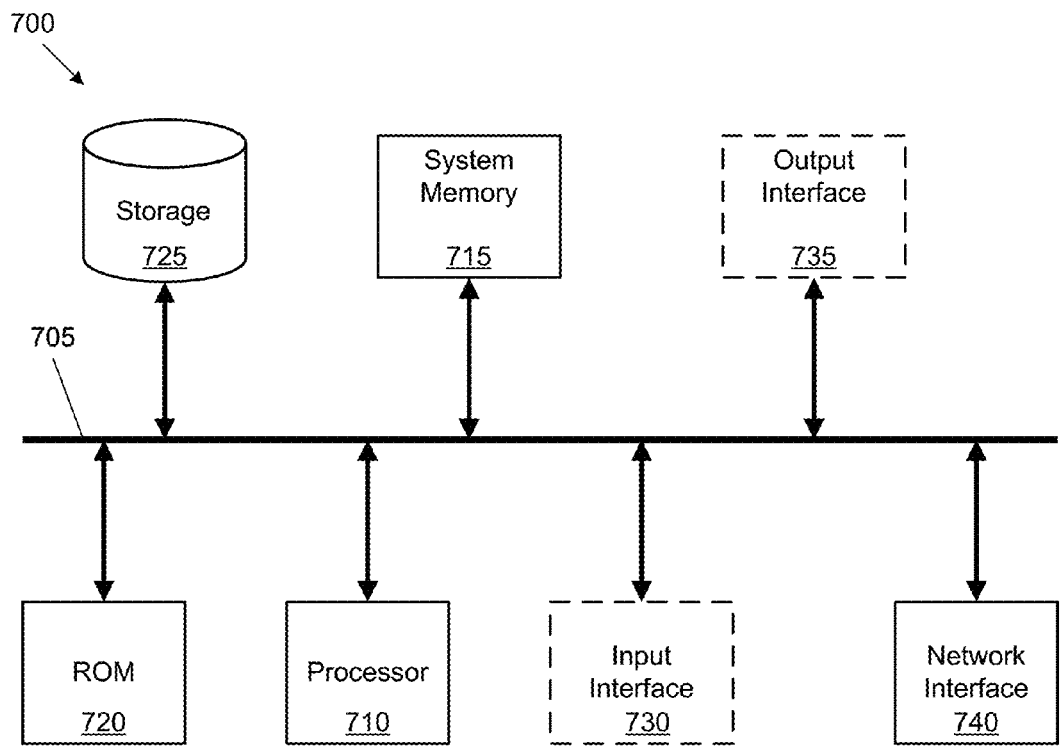
FIG. 7 conceptually illustrates a system with which some implementations of the subject technology may be implemented.

FIG. 7 conceptually illustrates a system 700 with which some implementations of the subject technology can be implemented. The system 700 can be a computer, phone, PDA, or any other sort of electronic device. In some configurations, the system 700 includes a television with one or more processors embedded therein. Such a system includes various types of computer readable media and interfaces for various other types of computer readable media. The system 700 includes a bus 705, processing unit(s) 710, a system memory 715, a read-only memory 720, a storage device 725, an optional input interface 730, an optional output interface 735, and a network interface 740.

The bus 705 collectively represents all system, peripheral, and chipset buses that communicatively connect the numerous internal devices of the system 700. For instance, the bus 705 communicatively connects the processing unit(s) 710 with the read-only memory 720, the system memory 715, and the storage device 725.

From these various memory units, the processing unit(s) 710 retrieves instructions to execute and data to process in order to execute the processes of the subject technology. The processing unit(s) can be a single processor or a multi-core processor in different implementations.

The read-only-memory (ROM) 720 stores static data and instructions that are needed by the processing unit(s) 710 and other modules of the system 700. The storage device 725, on the other hand, is a read-and-write memory device. This device is a non-volatile memory unit that stores instructions and data even when the system 700 is off. Some implementations of the subject technology use a mass-storage device (such as a magnetic or optical disk and its corresponding disk drive) as the storage device 725.

Other implementations use a removable storage device (such as a flash drive, a floppy disk, and its corresponding disk drive) as the storage device 725. Like the storage device 725, the system memory 715 is a read-and-write memory device. However, unlike storage device 725, the system memory 715 is a volatile read-and-write memory, such a random access memory. The system memory 715 stores some of the instructions and data that the processor needs at runtime. In some implementations, the subject technology's processes are stored in the system memory 715, the storage device 725, and/or the read-only memory 720. For example, the various memory units include instructions for processing multimedia items in accordance with some implementations. From these various memory units, the processing unit(s) 710 retrieves instructions to execute and data to process in order to execute the processes of some implementations.

The bus 705 also connects to the optional input and output interfaces 730 and 735. The optional input interface 730 enables the user to communicate information and select commands to the system. The optional input interface 730 can interface with alphanumeric keyboards and pointing devices (also called "cursor control devices"). The optional output interface 735 can provide display images generated by the system 700. The optional output interface 735 can interface with printers and display devices, such as cathode ray tubes (CRT) or liquid crystal displays (LCD). Some implementations can interface with devices such as a touchscreen that functions as both input and output devices.

Finally, as shown in FIG. 7, bus 705 also couples system 700 to a network interface 740 through a network adapter (not shown). In this manner, the computer can be a part of a network of computers (such as a local area network ("LAN"), a wide area network ("WAN"), or an Intranet, or an interconnected network of networks, such as the Internet. Any or all components of system 700 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a non-transitory machine-readable or non-transitory computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for suggesting one or more users based at least on geolocation information of a user, the method comprising:
   determining, by one or more computing devices, a current geolocation of a first user;
   determining, by the one or more computing devices, one or more users having a geolocation within a predetermined proximity of the determined current geolocation of the first user;
   determining, by the one or more computing devices, a subset of the determined one or more users by:
      identifying, by the one or more computing devices, for at least one of the one or more users, a previous geolocation of the at least one user that is different than the determined current geolocation of the first user, the previous geolocation having an associated timestamp; and
      determining, by the one or more computing devices, for each of the at least one users, whether the timestamp associated with the previous geolocation falls within a predetermined period of time;
   determining respective affinity scores for the determined subset of one or more users, wherein each respective affinity score is based on one or more attributes;
   sorting, by the one or more computing devices, the determined subset of the one or more users based at least in part on the timestamps associated with the previous geolocation of the at least one user and the determined respective affinity scores; and
   providing, by the one or more computing devices, for display at least a portion of the determined subset of one or more users based at least in part on the sorted subset.

2. The method of claim 1, further comprising:
   determining if the determined current geolocation of the first user is in a different geolocation than a previous geolocation of the first user, wherein the different geolocation is based at least on one of a country, city, county, postal code, or predetermined distance.

3. The method of claim 2, wherein the previous geolocation of the first user comprises a last shared geolocation of the first user.

4. The method of claim 3, wherein the last shared geolocation of the first user is based on a previous check-in activity of the first user.

5. The method of claim 3, wherein the previous geolocation of the first user was shared based on a periodic schedule of automatic geolocation sharing.

6. The method of claim 1, further comprising:
   determining a second subset of users from the determined subset of one or more users that at least has a previous geolocation that matches a previous geolocation of the first user.

7. The method of claim 1, wherein the predetermined proximity is based on a distance threshold from the determined current geolocation of the user.

8. The method of claim 1, wherein determining the current geolocation the first user is responsive to check-in activity of the first user.

9. The method of claim 8, wherein the check-in activity of the first user includes geolocation information of the first user in an online social network.

10. The method of claim 9, wherein the geolocation information is associated with one of an identified place, a point of interest, a business, an airport, a metropolitan area, a neighborhood, a municipality, and a tourist attraction.

11. The method of claim 1, wherein determining the one or more users within the predetermined proximity of the determined current geolocation of the first user is responsive to a respective check-in activity of the one or more users.

12. The method of claim 1, wherein the one or more attributes at least includes demographic information of the one or more users.

13. The method of claim 12, wherein the demographic information includes at least one of name, gender, ethnicity, age, occupation, education, country of origin, and geographic location.

14. The method of claim 1, wherein the one or more attributes include at least one of a user interest, hobby, and activity.

15. The method of claim 1, wherein providing for display of the subset of the determined one or more users comprises:
   generating an electronic map for display with one or more respective graphical representations of the determined subset of one or more users.

16. A system for suggesting one or more users based at least on geolocation information of a user, the system comprising:
   memory;
   one or more processors;
   one or more instructions stored in memory and configured for execution by the one or more processors, the instructions comprising:
      a set of geolocation instructions that when executed by the one or more processors cause the one or more processors to determine a current geolocation of a first user, determine one or more users having a geolocation within a predetermined proximity of the determined current geolocation of the first user, determine a subset of the determined one or more users by:
         identifying, for at least one of the one or more users, a previous geolocation of the at least one user that is different than the determined current geolocation of the first user, the previous geolocation having an associated timestamp; and
         determining, for each of the at least one users, whether the timestamp associated with the previous geolocation falls within a predetermined period of time;
      a set of scoring instructions that when executed by the one or more processors cause the one or more processors to determine respective affinity scores for the determined subset of one or more users, wherein each respective affinity score is based one or more attributes, and sort the determined subset of one or more users according to the determined respective affinity scores and the respective timestamps associated with the previous geolocations; and
      a set of graphical user interface (GUI) display instructions that when executed by the one or more processors cause the one or more processors to provide for display the sorted subset of one or more users.

17. The system of claim 16, wherein providing for display of the sorted subset of the one or more users comprises:
   generating an electronic map for display with one or more respective graphical representations of the sorted subset of the one or more users.

18. The system of claim 16, wherein the one or more attributes at least includes demographic information of the determined subset of one or more users.

19. A non-transitory machine-readable medium comprising instructions stored therein, which when executed by a machine, cause the machine to perform operations comprising:
   determining a current geolocation of a first user;
   determining one or more users within a predetermined proximity of the determined current geolocation of the first user;
   determining a subset of the determined one or more users by:
      identifying, for at least one of the one or more users, a previous geolocation of the at least one user that is different than the determined current geolocation of the first user, the previous geolocation having temporal data associated with the previous geolocation; and
      determining, for each of the at least one users, whether the temporal data associated with the previous geolocation falls within a predetermined period of time;
   determining respective affinity scores for the determined subset of one or more users, wherein each respective affinity score is based one or more attributes;
   sorting the determined subset of one or more users according to the determined respective affinity scores and the temporal data; and
   providing for display the sorted subset of one or more users.

* * * * *